Patented May 13, 1930

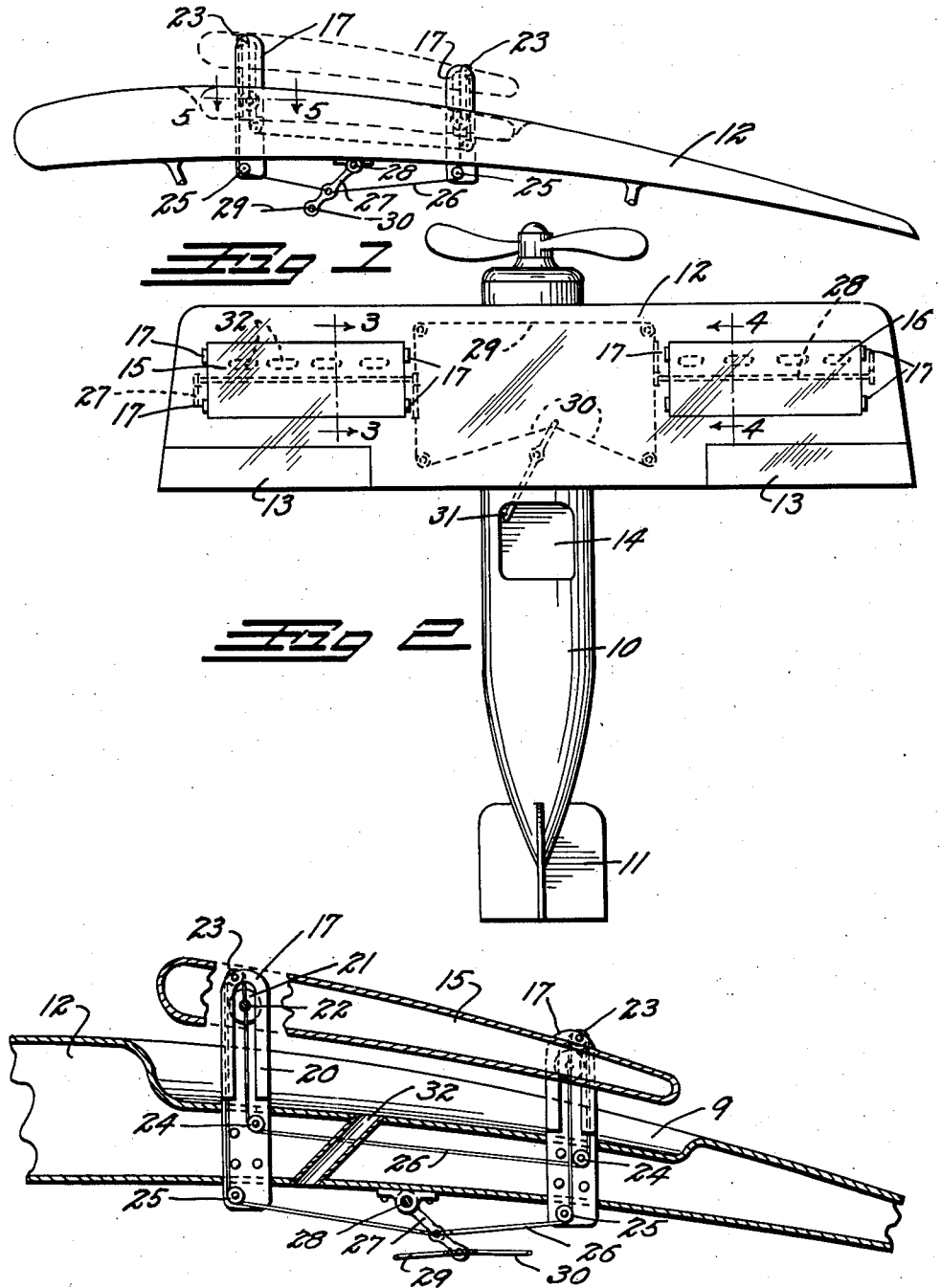

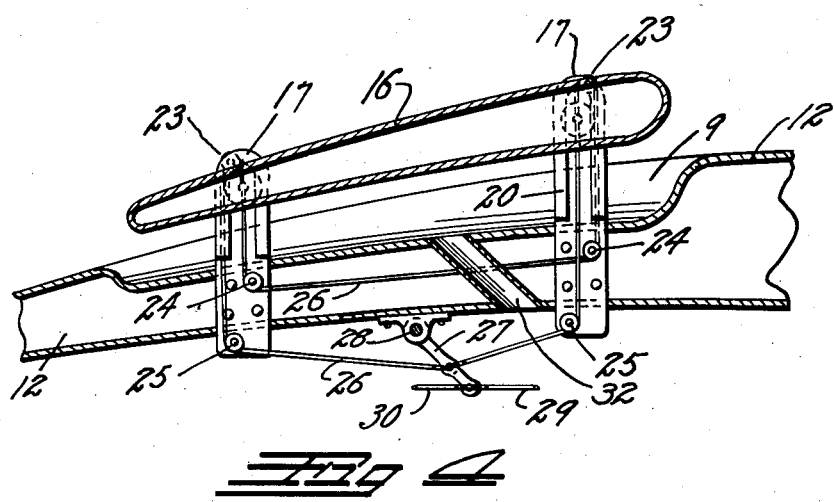
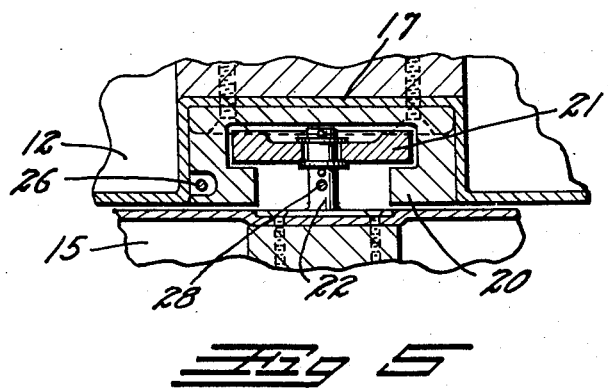

1,758,355

UNITED STATES PATENT OFFICE

WILLIAM F. COTTRELL AND JOSEPH McAULIFFE, OF DENVER, COLORADO

AIRPLANE WING

Application filed February 9, 1928. Serial No. 253,106.

This invention relates to means for providing additional lifting surface to the wing of an airplane.

The principal object of the invention is to provide means for enabling the airplane to take off and land at a low speed.

Another object of the invention is to so construct the additional lifting surface that it need be used only when taking off or landing.

A further object is to provide additional aerofoils which will add but a minimum of weight to the plane and which can be brought into action only when necessary.

A still further object is to construct the operating mechanism of the additional aerofoils so that it will present a minimum of wind resistance.

Other objects and advantages reside in the detail construction of the invention, which is designed for simplicity, economy and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is an end view of an airplane wing to which our invention is applied.

Fig. 2 is a plan view of an airplane illustrating the position of the additional aerofoil surfaces.

Fig. 3 is a cross section taken on the line 3—3, Fig. 2,

Fig. 4 is a similar cross section taken on the line 4—4, Fig. 2.

Fig. 5 is a detail cross section through the additional aerofoil supporting bracket taken on the line 5—5, Fig. 1.

In the drawing, the various parts of the airplane are designated by numerals as follows: Fuselage 10, vertical rudder or elevator 11, wings 12, ailerons 13, and cockpit 14.

We attain the objects of our invention by the use of two relatively auxiliary aerofoils 15 and 16 which are indented into the top of the main wing 12 in suitable indentations 9 made to conform to the outline of the aerofoil so that when they are in place in the main wing the upper surface line of the main wing is uninterrupted. The auxiliary aerofoils are designed with a section similar to the main wing, that is, their upper and lower surfaces have profiles substantially similar to the profiles of the upper and lower surfaces of the main wings contours.

The aerofoils are each supported in four brackets 17 arranged approximately at their corners. The brackets 17 are secured to the supporting structure or ribs of the main wing and extend therethrough. Each of the brackets 17 has inwardly turned edges 20 forming guides for rollers 21. The rollers 21 are carried on studs 22 secured in any desired manner to the auxiliary aerofoils. The brackets act as guides to cause the auxiliary aerofoils to rise vertically from their depressions 9 in the main wing.

Each of the brackets 20 is provided with an upper pulley 23, an inner pulley 24 and a lower pulley 25. An endless cable 26 is trained over these pulleys between each pair of brackets at each end of each auxiliary aerofoil. Extending longitudinally under the main wing at each of the auxiliary aerofoils is a short shaft 28. Each of the shafts 28 carries downwardly depending levers 27 fixed thereto adjacent each of its extremities.

At the auxiliary aerofoil 15, each of the cables 26 passes from one of the levers 27 rearwardly below the main wing 12 to the rear bracket 17, thence under the rear lower pulley 25, and upwardly to a connection with the stud 22, as shown at 28, Fig. 5. From the studs 22 the cables 26 pass upwardly over the upper pulleys 23, downwardly under the rear inner pulleys 24, to the front inner pulley 24, thence upwardly to a connection with forward studs 17. From the forward studs the cables pass upwardly over the upper pulleys 23 and downwardly under the lower pulleys 25 back to a connection with the lever 27. Thus when the lever 27 is moved forwardly the aerofoil 15 will lower uniformly throughout its width and, when the lever is moved rearwardly, the aerofoil 15 will similarly rise.

The cable arrangement at the aerofoil 16 is similar in general idea, but the cable reaches which connect to the levers 27 in wing 16 at aerofoil 16 under the inner pulleys, and the reaches which in wing 16 pass between the inner pulleys 24 are, in wing 15, connected to the lever. Thus when the levers 27 of wing 16 are moved forwardly, the aerofoil 16 will rise and when the levers are moved rearwardly, the aerofoil 16 will lower, thus having an opposite motion from the wing 15.

This opposite action is designed so that a single aileron-like control cable may be used. This cable is shown in broken line in Fig. 2, and comprises a forward section 29 which passes between the levers 27 at the opposite sides of the wing 12, and a rear section 30 which similarly passes between the levers and is connected to a control stick 31. By this arrangement, as the free extremity of the control stick 31 is moved to the right, the levers 27 on the aerofoil 16 will swing rearwardly, and the levers 27 on the aerofoil 15 will swing forwardly so that both auxiliary aerofoils will rise out of their depressions in the main wing.

When the auxiliary aerofoils are positioned above the main wing, they provide an additional pressure and vacuum surface. The wind stream will pass under the auxiliary aerofoils creating pressure on their lower surfaces and at the same time creating a vacuum in the depressions from which the wings have risen. This pressure surface is in addition to the usual surface of the main wing. In addition to this, the two upper surfaces of the auxiliary aerofoils will also create a vacuum area giving additional lifting action.

While the wing is flying on a level course, the auxiliary aerofoils can be lowered into their depressions, thus reducing head resistance and increasing plane speed.

To assist the lifting action of the auxiliary aerofoils, we provide diagonal slots 32 through the main wings 12 immediately under the auxiliary aerofoils. These slots pass high pressure air from the pressure surface from the main wing to the pressure surface of the auxiliary wing, thus increasing the lifting action of the auxiliary aerofoils and exerting a stabilizing effect upon the main wings.

While a specific form of the improvement has been described and illustrated herein, it is desired to be understood that the same may be varied, within the scope of the appended claims, without departing from the spirit of the invention.

We claim:

1. Airfoil construction for airplane wings comprising relatively small airfoils adapted to be carried in depressions in the top of said wing; means for raising said airfoils from their depressions and maintaining them in a position above said wing, said means comprising brackets extending upwardly from said wing adjacent said airfoils; guides in said brackets; projections on said airfoils adapted to engage said guides; and flexible means carried by said brackets adapted to raise or lower said projections therein.

2. Means for causing an airfoil to rise uniformly above the top of an airplane wing comprising brackets extending above said wing adjacent said airfoil and adapted to guide the movement thereof; pulleys carried adjacent the top and bottom of said brackets; an endless cable trained over said pulleys and operatively connected to said airfoil so that movement of said cable in one direction will lower it, there being a similar raising means at each extremity of said airfoil; means for causing said two raising means to operate simultaneously, said means comprising a shaft; a pair of levers fixed to and projecting from said shaft, each of said levers being connected to one of said cables; and means for rotating said shaft.

3. An airplane wing comprising: a main wing having a depression in its upper surface; an auxiliary wing adapted to fill said depression; and means for allowing said auxiliary wing to rise and stops arranged to limit the movement of said auxiliary wing to a parallel position slightly above said depression so that the air stream will be forced by said auxiliary wing into said depression.

4. An airplane wing comprising: a main wing having a depression in its upper surface; an auxiliary wing adapted to fill said depression; and means for allowing said auxiliary wing to rise to a parallel position slightly above said depression so that the air stream will be forced by said auxiliary wing into said depression, said means comprising a guide member adjacent each corner of said auxiliary wing; tracks in said guide member; projections on said auxiliary wing adapted to travel in said tracks, said tracks being closed adjacent the upper extremity of said members so as to regulate the movement of said auxiliary wing to a relatively small distance above said depression.

5. An airplane wing comprising: a main wing having a depression in its upper surface; an auxiliary wing adapted to fill said depression; means for allowing said auxiliary wing to rise to a parallel position slightly above said depression so that the air stream will be forced by said auxiliary wing into said depression, said means comprising a guide member adjacent each corner of said auxiliary wing; tracks in said guide member; projections on said auxiliary wing adapted to travel in said tracks, said tracks being closed adjacent the upper extremity of said members so as to regulate the movement of said auxiliary wing to a relatively small distance above said depression; an endless cable trained between the guide members at each extremity of said wing; the projections at that extremity being connected to said cable so that movement of said cable will cause said wing to rise uniformly in each guide member.

6. An airplane wing comprising: a main wing having a depression in its upper surface; an auxiliary wing adapted to fill said depression; and means for allowing said auxiliary wing to rise to a parallel position slightly above said depression so that the air stream will be forced by said auxiliary wing into said depression, said means comprising: a guide member adjacent each corner of said auxiliary wing; tracks in said guide member; projections on said auxiliary wing adapted to travel in said tracks, said tracks being closed adjacent the upper extremity of said members so as to regulate the movement of said auxiliary wing to a relatively small distance above said depression; an endless cable trained between the guide members at each extremity of said wing, the projections at that extremity being connected to said cable so that movement of said cable will cause said wing to rise uniformly in each guide member; and means for causing the two endless cables to move in unison comprising a shaft extending the length of said auxiliary airfoil and levers fixed to said shaft adjacent the extremities thereof between each pair of guide members, said levers being connected to said endless cables.

In testimony whereof, we affix our signatures.

WILLIAM F. COTTRELL.
JOSEPH McAULIFFE.